US012567709B2

(12) United States Patent
Zhao et al.

(10) Patent No.: US 12,567,709 B2
(45) Date of Patent: Mar. 3, 2026

(54) ELECTRICAL CONNECTOR UPPER AND LOWER CONTACTS MADE FROM A SINGLE CONTACT CARRIER IN TWO GROUPS

(71) Applicants: Fuyu Electronic Technology (Huai'an) Co., Ltd., Huai'an (CN); FOXCONN INTERCONNECT TECHNOLOGY LIMITED, Grand Cayman (KY)

(72) Inventors: Jun Zhao, Huaian (CN); Cai-Yun Zhang, Huaian (CN)

(73) Assignees: Fuyu Electronic Technology (Huai'an) Co., Ltd., Huai'an (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 445 days.

(21) Appl. No.: 18/068,818

(22) Filed: Dec. 20, 2022

(65) Prior Publication Data

US 2023/0129058 A1 Apr. 27, 2023

Related U.S. Application Data

(62) Division of application No. 16/726,973, filed on Dec. 26, 2019, now Pat. No. 11,569,627.

(30) Foreign Application Priority Data

Dec. 28, 2018 (CN) ......................... 201811617284.3

(51) Int. Cl.
*H01R 43/16* (2006.01)
*H01R 13/02* (2006.01)
(Continued)

(52) U.S. Cl.
CPC ............. *H01R 43/16* (2013.01); *H01R 13/02* (2013.01); *H01R 13/26* (2013.01); *H01R 13/40* (2013.01);
(Continued)

(58) Field of Classification Search
CPC ........ H01R 43/16; H01R 13/02; H01R 13/26; H01R 13/40; H01R 13/50; H01R 43/24;
(Continued)

(56) References Cited

U.S. PATENT DOCUMENTS 7,621,788 B1 11/2009 Feng
9,728,916 B1 * 8/2017 Tsai ..................... H01R 13/516
(Continued)

FOREIGN PATENT DOCUMENTS

CN 202025889 U 11/2011
CN 102280735 A 12/2011
(Continued)

*Primary Examiner* — Travis S Chambers
(74) *Attorney, Agent, or Firm* — Ming Chieh Chang

(57) ABSTRACT

An electrical connector includes an insulative housing having a tongue with two opposite surfaces and plural contacts with contacting portions exposed to the two opposite surfaces of the tongue. The plural contacts are originally formed from a same sheet metal to have one group of contacts thereof each with a respective contacting portion exposed to one surface of the front tongue and the other group of contacts thereof each with a respective contacting portion exposed to the other surface of the front tongue and the contacting portions of the one group of contacts are situated beside the contacting portions of the other group of contacts. The contacting portion in the one group includes more offset structures or experiences more offset distances than that in the other group.

10 Claims, 9 Drawing Sheets

(51) Int. Cl.

| | |
|---|---|
| ***H01R 13/26*** | (2006.01) |
| ***H01R 13/40*** | (2006.01) |
| ***H01R 13/50*** | (2006.01) |
| ***H01R 43/24*** | (2006.01) |
| *H01R 13/6581* | (2011.01) |

(52) U.S. Cl.
CPC ............. *H01R 13/50* (2013.01); *H01R 43/24* (2013.01); *H01R 13/6581* (2013.01)

(58) Field of Classification Search
CPC .. H01R 13/6581; H01R 24/60; H01R 13/405; H01R 43/20
See application file for complete search history.

(56) References Cited

U.S. PATENT DOCUMENTS

| | | | | |
|---|---|---|---|---|
| 11,688,990 | B2 * | 6/2023 | Chang .................... | H01R 43/16 29/874 |
| 2017/0373439 | A1 | 12/2017 | Wen et al. | |
| 2020/0119509 | A1 * | 4/2020 | Su .......................... | H01R 43/24 |
| 2020/0212642 | A1 * | 7/2020 | Zhao ...................... | H01R 13/02 |
| 2022/0181816 | A1 * | 6/2022 | Chen .................... | H01R 12/724 |

FOREIGN PATENT DOCUMENTS

| | | | |
|---|---|---|---|
| CN | 202917667 | U | 5/2013 |
| CN | 104882696 | A | 9/2015 |
| CN | 105406241 | A | 3/2016 |
| CN | 105449398 | A | 3/2016 |
| CN | 105655763 | A | 6/2016 |
| CN | 106207552 | A | 12/2016 |
| CN | 106299825 | A | 1/2017 |
| CN | 105024197 | B | 4/2018 |
| CN | 207353544 | U | 5/2018 |
| CN | 207572614 | U | 7/2018 |
| CN | 109038000 | A | 12/2018 |
| TW | 201304291 | A | 1/2013 |

* cited by examiner

ELECTRICAL CONNECTOR UPPER AND LOWER CONTACTS MADE FROM A SINGLE CONTACT CARRIER IN TWO GROUPS

CROSS-REFERENCE TO RELATED APPLICATION

This application is a divisional application of U.S. patent application Ser. No. 16/726,973, filed on Dec. 26, 2019, entitled "MAKING UPPER AND LOWER CONTACTS OF AN ELECTRICAL CONNECTOR FROM A SINGLE CONTACT CARRIER."

BACKGROUND OF THE INVENTION

Field of the Invention

The present invention relates to an electrical connector including an insulative housing and a plurality of contacts molded with the insulative housing, wherein the plurality of contacts are formed from a single contact carrier and the molding operation is performed in one shot.

Description of Related Arts

China Patent No. 207572614 discloses an electrical connector including two rows of contacts made from respective contact carriers and an insulative housing molded to the two rows of contacts in two shots. U.S. Pat. No. 7,621,788 discloses an electrical connector pin carrier having a main panel, a secondary panel, and a set of first pins and a set of second pins both connected between the main panel and the secondary panel. The two sets of pins have respective contacting portions to be exposed to two opposite surfaces of an insulative housing tongue.

SUMMARY OF THE INVENTION

A method of making an electrical connector which includes an insulative housing having a tongue with two opposite surfaces and plural contacts with contacting portions exposed to the two opposite surfaces of the tongue is characterized by the steps of: forming the plurality of contacts from a single contact carrier to have one group of contacts thereof each with a respective contacting portion connected to a first carrier strip and the other group of contacts thereof each with a respective contacting portion connected to a second carrier strip situated beside the first carrier strip; insert-molding the plurality of contacts with an insulator to form the insulative housing while exposing front ends of the plurality of contacts; and severing the first carrier strip and the second carrier strip from the front ends of the plurality of contacts.

DETAILED DESCRIPTION OF THE DRAWINGS

Figure 1:
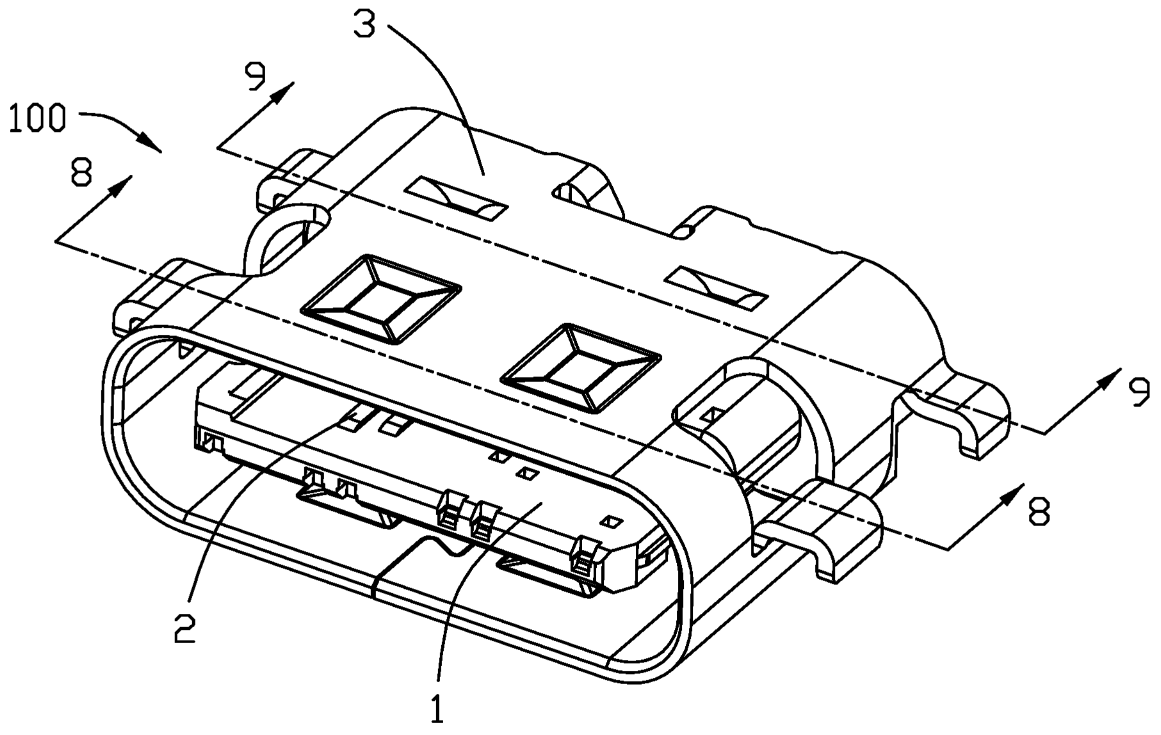
FIG. 1 is a top perspective view of an electrical connector in accordance with the present invention.
Figure 2:
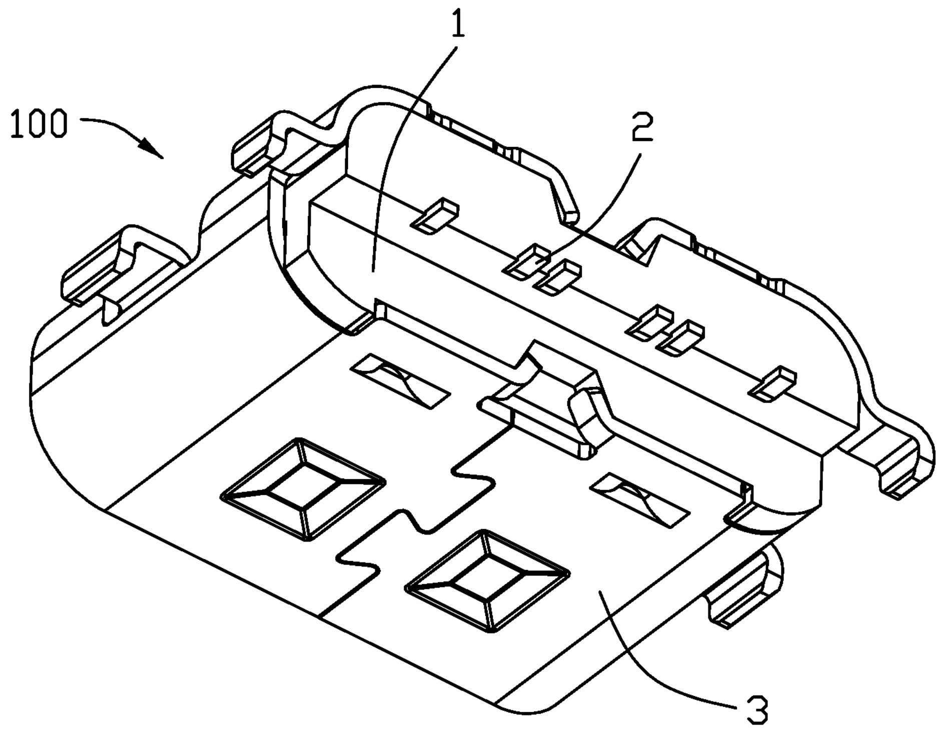
FIG. 2 is a bottom perspective view of the electrical connector.
Figure 3:
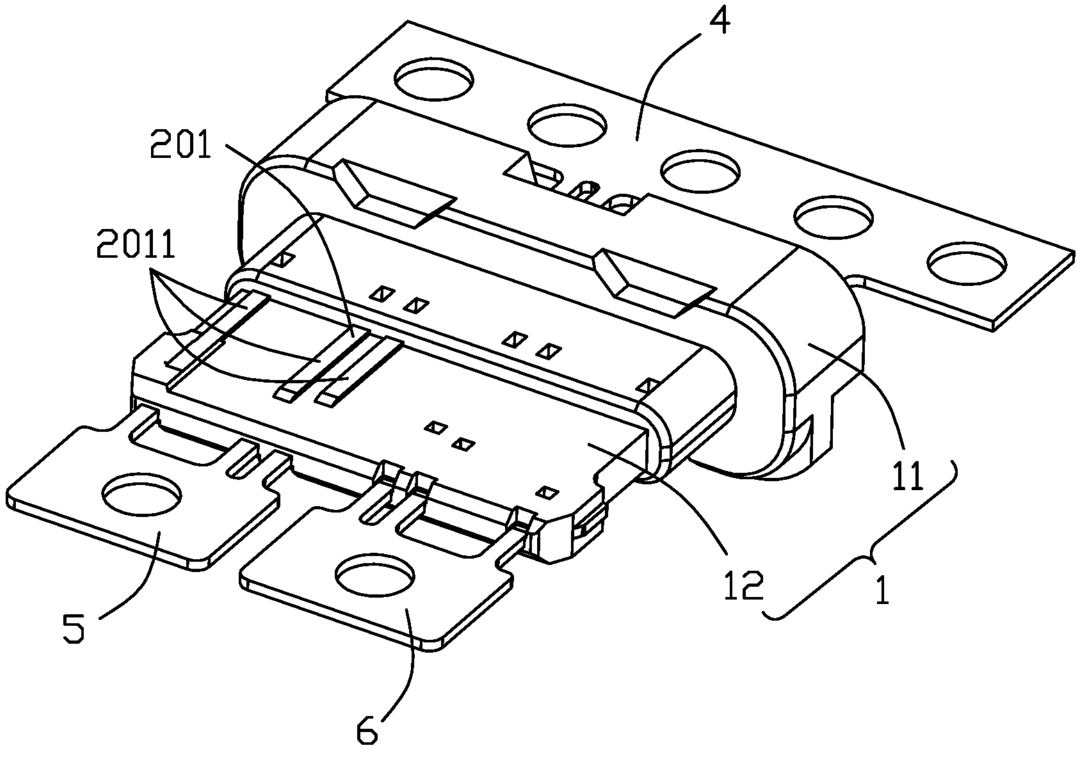
FIG. 3 is a top perspective view of an intermediate product relating to the electrical connector.
Figure 4:
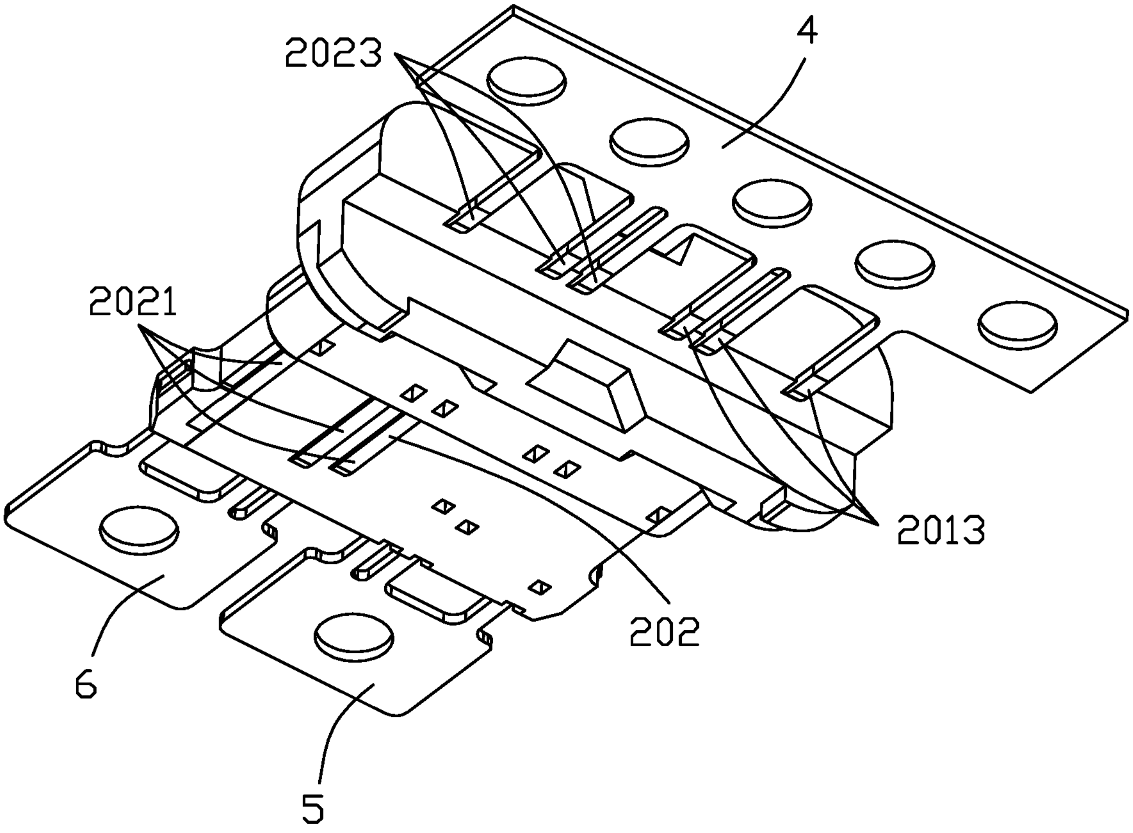
FIG. 4 is a bottom perspective view of the intermediate product.

Referring to FIGS. 1-9, an electrical connector 100 in accordance with the present invention is embodied as a USB Type C receptacle connector for charging purpose and comprises an insulative housing 1 and a plurality of contacts 2 secured to the insulative housing 1. The electrical connector 100 may further comprise a shielding shell 3 enclosing the insulative housing 1 to form a mating space. The plurality of contacts 2 are molded with the insulative housing 1 in one-shot molding operation.

The insulative housing 1 has a base 11 and a frontal tongue 12. The plurality of contacts 2 is arranged as an upper contact group 21 including plural upper contacts 201 and a lower contact group 22 including plural lower contacts 202. Each upper contact 201 has a securing portion 2012, a front contacting portion 2011 exposing to an upper mating surface 121 of the tongue 12, and a rear soldering portion 2013; each lower contact 202 has a securing portion 2022, a front contacting portion 2021 exposing to a lower mating surface 122 of the tongue 12, and a rear soldering portion 2023. The soldering portions 2013 and 2023 of all the contacts 2 are arranged at a same plane in a line. Respective front ends of the upper contacts 201 are bent to form heads 2010 to be embedded in the tongue 12 while exposing to grooves 1220 thereof; respective front ends of the lower contacts 202 are bent to form heads 2020 to be embedded in the tongue 12 while exposing to grooves 1210 thereof. Each groove 1220 or 1210 has a pair of side walls and a rear wall. During manufacturing, molding tools may be employed to press on the heads 2010 and 2020. The rear wall may have a sloped surface for guiding a corresponding contact of a complementary connector to pass smoothly.

The contacts 2 are formed from same contact carrier to have one group of contacts thereof, namely the upper contact group 21, situated beside the other group of contacts, namely the lower contact group 22. The upper contact group 21 includes one outermost ground contact 210, one power contact 211 adjacent to the ground contact 210 while spacing two vacant contact positions therefrom, and one detect contact 212 immediately adjacent the power contact 211; the lower contact group 22 includes one outermost ground contact 220, one power contact 221 adjacent to the ground contact 220 while spacing two vacant contact positions therefrom, and one detect contact 222 immediately adjacent the power contact 221. The contacting portions 2011 of the ground contact 210, the power contact 211, and the detect contact 212 are exposed to the upper surface 121, forming an upper row. The contacting portion 2021 of the ground contact 220, the power contact 221, and the detect contact 222 are exposed to the lower surface 122, forming a lower row. There is a respective bend at a junction between the contacting portion 2021 and the securing portion 2022 of each lower contact 202, while the contacting portion 2011 of each upper contacts 201 is coplanar with the securing portion 2012 thereof.

During manufacturing, rear ends of the upper contact group 21 are connected to a first carrier strip 4, while the front ends thereof are connected to a second carrier strip 5; rear ends of the lower contact group 22 are connected to same first carrier strip 4, while the front ends thereof are connected to a third carrier strip 6 that is situated beside the second carrier strip 5. A respective V-shaped cut 2014 is formed at a junction of the second carrier strip 5 and the head 2010 and a respective V-shaped cut 2024 is formed at a junction of the third carrier strip 6 and the head 2020, for ease of severing the carrier strips after the insulative housing 1 is molded.

Each of the surfaces 121 and 122 of the tongue 12 provides twelve (12) contact positions arranged centrally-symmetrically to support dual-orientation mating as is well known in this art, though not all contact positions are occupied. In the embodiment shown, on the first surface 121, the ground contact 210 occupies the first contact position, the power contact 211 occupies the fourth contact position, and the detect contact 212 occupies the fifth contact position; on the second surface 122, the ground contact 220 occupies the first contact position, the power contact 221 occupies the fourth contact position, and the detect contact 222 occupies the fifth contact position.

The ground contact 210 has an integral latching portion 2101 exposed to one side surface 123 of the tongue 12; the ground contact 220 has an integral latching portion 2201 exposed to the other side surface 124 of the tongue 12. The latching portion 2210 has an upper part 2211 and a lower part 2212 exposed to a corresponding side surface 123 of the tongue 12.

To make the electrical connector 100, the method may include primarily a step of forming the plurality of contacts 2 from a single contact carrier to have the upper contact group 21 with respective contacting portions 2011 connected to the carrier strip 5 and the lower contact group 22 with respective contacting portions 2021 connected to the carrier strip 6 situated beside the carrier strip 5; a step of insert-molding the plurality of contacts 2 with an insulator to form the insulative housing 1 while exposing the heads 2010 and 2020; and a step of severing the carrier strip 5 and the carrier strip 6 from the heads of the plurality of contacts 2. As is well known in this art, the shielding shell 3 may subsequently be assembled and the carrier strip 4 severed.

Figure 5:
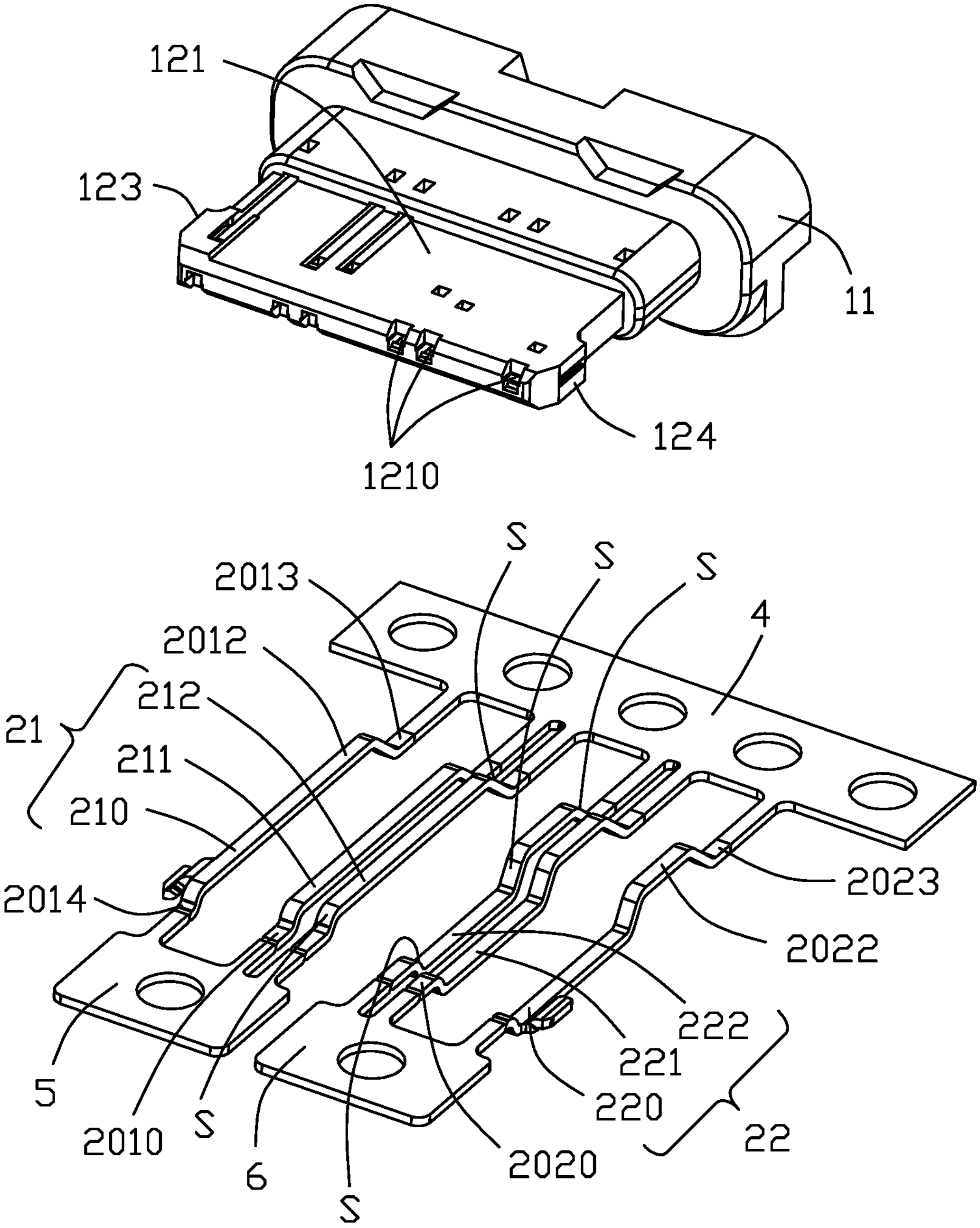
FIG. 5 is an exploded view of the intermediate product in FIG. 3.
Figure 6:
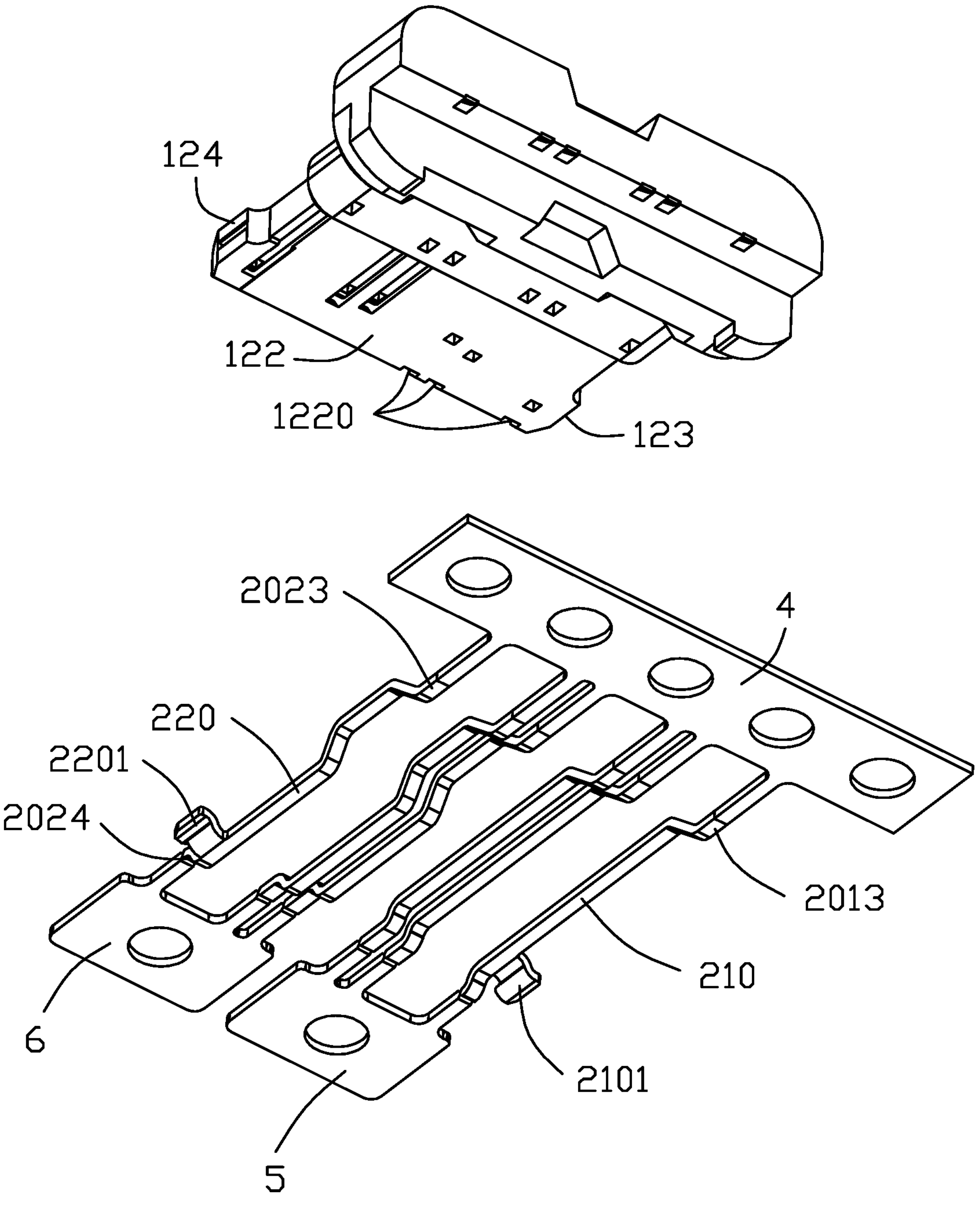
FIG. 6 is an exploded view of the intermediate product in FIG. 4.
Figure 7:
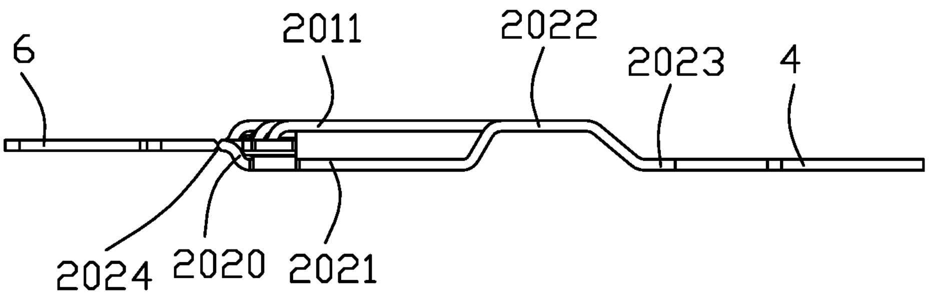
FIG. 7 shows a plurality of contacts of the electrical connector formed on a single contact carrier and an insulative housing molded with the contacts.
Figure 8:
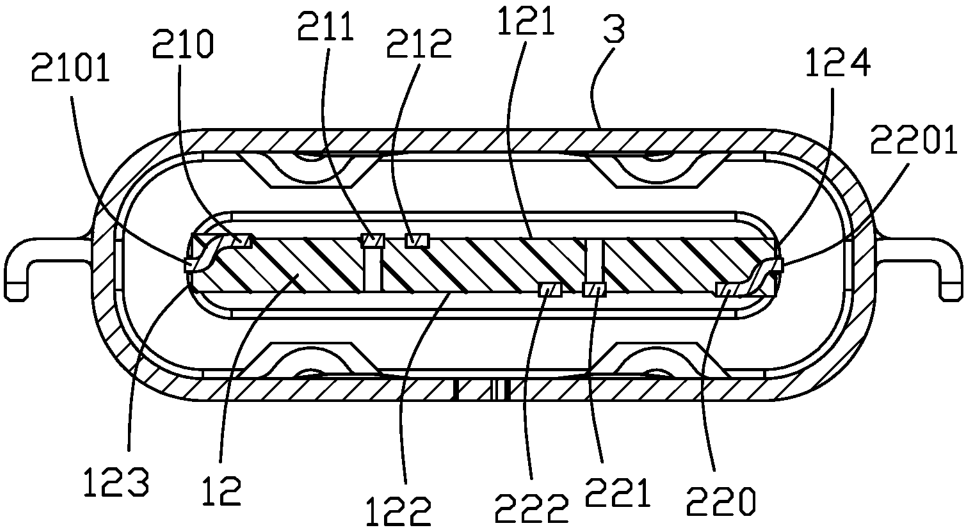
FIG. 8 is a cross-sectional view of the electrical connector taken along line A-A in FIG. 1.
Figure 9:
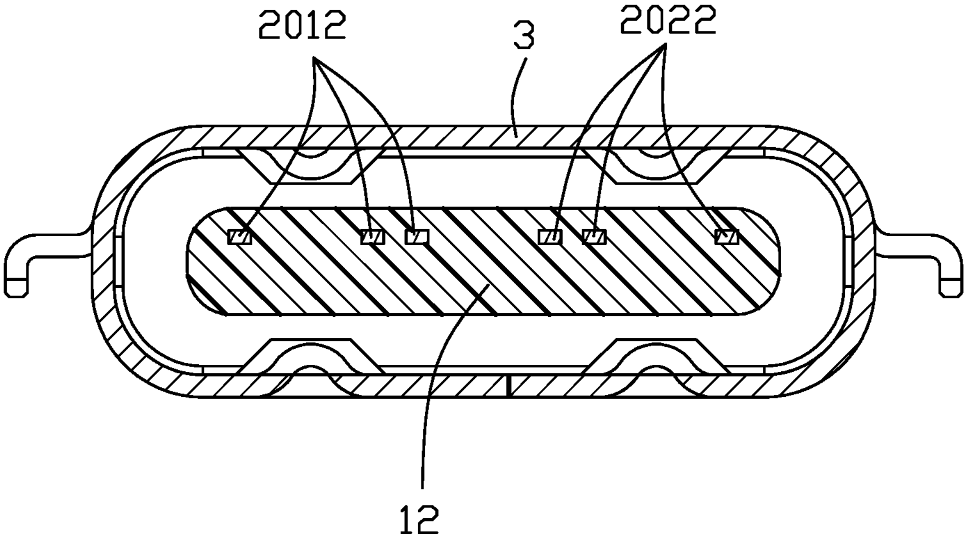
FIG. 9 is a cross-sectional view of the electrical connector taken along line B-B in FIG. 1.

In this embodiment, the first carrier strip 5 and the second carrier strip 6 are essentially located at the same horizontal plane which is essentially at the mid-level of the front tongue 12 for facilitating molding. Understandably, the reason why it is required to have the first carrier strip 5 discrete from the second carrier strip 6 is that the contacts of the lower contact group 22 experience more offsets than those of the upper contact group 21, thus resulting in more material consumption. Notably, as shown in FIG. 5, the contact of the upper contact group 21 only has two offset structures S while the contact of the lower contact group 22 has at least three offset structures S disregarding the distance/dimension of such a offset structure S. In other words, if the first carrier strip 5 and the second carrier strip 6 are still unified together to be one piece as the rear contact strip 4, the contacts of the lower contact group 22 may have more tensioned force internally than the those of the upper contact group 21, thus jeopardizing the balanced or symmetrical structures from the mechanical viewpoint. In addition, in each group the front offset structure S of the outermost grounding contact 210, 220 is located in front of the front offset structure S of the power contact 211, 221 which is located in front of the front offset structure S of the detect contact 212, 222. The offset arrangement for the front offset structures S of the grounding contact 210, 220, the power contact 211, 221 and the detect contact 212, 222 at different positions in the front-to-back direction may avoid force concentration applied to the specific position of the whole contact group.

The invention claimed is:

1. An electrical connector comprising:

an insulative housing having a front tongue with two opposite surfaces and two lateral surfaces; and a plurality of contacts being insert-molded with the insulative housing and having respective contacting portions exposed to the two opposite surfaces of the front tongue; wherein the plurality of contacts are originally formed from a same sheet metal to have one group of contacts thereof each with a respective contacting portion exposed to one surface of the front tongue and the other group of contacts thereof each with a respective contacting portion exposed to the other surface of the front tongue; and the contacting portions of the one group of contacts are situated laterally beside the contacting portions of the other group of contacts.

2. The electrical connector as claimed in claim 1, wherein the contacting portions of the one group of contacts are oriented reversely-symmetrically with respect to the contacting portions of the other group of contacts.

3. The electrical connector as claimed in claim 1, wherein in each group of contacts, the contacts have front offset structures at different positions in a front-to-back direction.

4. The electrical connector as claimed in claim 1, wherein front ends of all contacts in both two groups are located at a same mid-level of the front tongue.

5. An electrical connector assembly for completion of a final electrical connector comprising:

an insulative housing having a front tongue with opposite first and second surfaces thereon in a vertical direction; and a first groups of contacts and a second group of contacts being commonly insert-molded with the insulative housing and having respective contacting portions respectively exposed upon the first surface and second surface of the front tongue in the vertical direction; wherein each of said contacts extends along a front-to-back direction perpendicular to the vertical direction;

the one group of contacts is spaced from the other group of contacts in a transverse direction perpendicular to both the vertical direction and the front-to-back direction;

both said first group of contacts and said second group of contacts are originally stamped from a same sheet metal and respectively linked to a first front carrier strip and a second front carrier strip which belong to the same sheet metal but are discrete from each other;

both the first front carrier strip and the second front carrier strip are required to be removed away from the both two groups of contacts before completion of the final electrical connector; and the contacting portion in said one group includes more offset structures or experiences more offset distances than that in the other group.

6. The electrical connector assembly as claimed in claim 5, wherein both said first group of contacts and said second group of contacts are originally commonly linked with a same rear carrier strip belonging to the same sheet metal, and the same rear carrier strip is required to be removed away from the both two groups of contacts before completion of the final electrical connector.

7. The electrical connector assembly as claimed in claim 5, wherein in each group of contacts, the contacts have front offset structures at different positions in the front-to-back direction.

8. The electrical connector assembly as claimed in claim 5, wherein front ends of all contacts in both two groups are located at a same mid-level of the front tongue.

9. The electrical connector assembly as claimed in claim 5, wherein in each group, the contacting portion of an outermost contact includes a lateral protrusion exposed laterally in the transverse direction on a mid-level of the front tongue in the vertical direction, and functioning as a latching portion.

10. An electrical connector comprising:

an insulative housing having a front tongue with two opposite surfaces; and a plurality of contacts being insert-molded with the insulative housing and having respective contacting portions exposed to the two opposite surfaces of the front tongue; wherein the plurality of contacts are originally formed from a same sheet metal to have one group of contacts thereof each with a respective contacting portion exposed to one surface of the front tongue and the other group of contacts thereof each with a respective contacting portion exposed to the other surface of the front tongue;

the one group of contacts is situated beside the other group of contacts; and the contacting portion in said one group includes more offset structures or experiences more offset distances than that in the other group.

* * * * *